US012140038B2

(12) United States Patent
Joo

(10) Patent No.: US 12,140,038 B2
(45) Date of Patent: Nov. 12, 2024

(54) TURBINE AIRFOIL, TURBINE, AND GAS TURBINE INCLUDING SAME

(71) Applicant: DOOSAN ENERBILITY CO., LTD., Changwon-si (KR)

(72) Inventor: Hyun Woo Joo, Changwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 4 days.

(21) Appl. No.: 17/933,085

(22) Filed: Sep. 17, 2022

(65) Prior Publication Data

US 2023/0128531 A1 Apr. 27, 2023

(30) Foreign Application Priority Data

Oct. 27, 2021 (KR) ........................ 10-2021-0145024

(51) Int. Cl.
*F01D 25/12* (2006.01)
*F01D 9/06* (2006.01)

(52) U.S. Cl.
CPC ............... *F01D 25/12* (2013.01); *F01D 9/06* (2013.01); *F05D 2220/32* (2013.01); *F05D 2240/12* (2013.01); *F05D 2260/202* (2013.01)

(58) Field of Classification Search
CPC . F01D 9/06; F01D 25/12; F01D 5/187; F01D 5/18; F05D 2220/32; F05D 2240/12; F05D 2260/202; F05D 2260/22141; F05D 2260/2214; F02C 7/12
See application file for complete search history.

(56) References Cited

U.S. PATENT DOCUMENTS

| | | | | | |
|---|---|---|---|---|---|
| 5,498,126 | A * | 3/1996 | Pighetti | F01D 9/065 415/115 |
| 6,132,174 | A | 10/2000 | Staub | |
| 6,595,750 | B2 | 7/2003 | Parneix | |
| 6,890,153 | B2 * | 5/2005 | Demers | F01D 5/186 415/115 |
| 7,137,784 | B2 | 11/2006 | Hall | |
| 8,864,468 | B1 * | 10/2014 | Liang | F01D 9/041 415/115 |
| 8,985,940 | B2 * | 3/2015 | Zhang | F01D 5/081 415/115 |
| 10,156,146 | B2 * | 12/2018 | Walunj | F02C 7/12 |
| 10,196,906 | B2 * | 2/2019 | Lee | F01D 5/187 |
| 10,711,619 | B2 * | 7/2020 | Marsh | F01D 5/186 |
| 10,774,655 | B2 * | 9/2020 | Spangler | F01D 25/12 |

(Continued)

FOREIGN PATENT DOCUMENTS

| | | | |
|---|---|---|---|
| CN | 111852574 | A | 10/2020 |
| JP | H10252405 | A | 9/1998 |

(Continued)

OTHER PUBLICATIONS

The KR Office Action, dated Sep. 26, 2023.

*Primary Examiner* — Courtney D Heinle
*Assistant Examiner* — Andrew Thanh Bui
(74) *Attorney, Agent, or Firm* — Harvest IP Law, LLP

(57) ABSTRACT

An airfoil includes a plurality of cooling paths through which cooling air flows, and a first flow guide and a second flow guide disposed at a path connection part connecting the cooling paths to guide the flow of the cooling air, wherein the first flow guide is fixed to a pressure surface and the second flow guide is fixed to a suction surface.

14 Claims, 8 Drawing Sheets

(56) References Cited

U.S. PATENT DOCUMENTS

| | | | | |
|---|---|---|---|---|
| 10,815,791 | B2 * | 10/2020 | Meier | F01D 5/3007 |
| 2015/0037165 | A1 * | 2/2015 | Jones | F01D 5/16 416/232 |
| 2017/0044906 | A1 * | 2/2017 | Mongillo | F01D 5/147 |
| 2019/0178087 | A1 | 6/2019 | Meier | |

FOREIGN PATENT DOCUMENTS

| | | | |
|---|---|---|---|
| JP | 2002-129903 | A | 5/2002 |
| JP | 2017-115880 | A | 6/2017 |
| KR | 1020060044734 | A | 5/2006 |
| KR | 20150082944 | A | 7/2015 |
| KR | 10-2016-0124594 | A | 10/2016 |
| KR | 10223502 | B1 | 3/2021 |

* cited by examiner

TURBINE AIRFOIL, TURBINE, AND GAS TURBINE INCLUDING SAME

CROSS REFERENCE TO RELATED APPLICATION

The present application claims priority to Korean Patent Application No. 10-2021-0145024, filed on Oct. 27, 2021, the entire contents of which are incorporated herein for all purposes by this reference.

BACKGROUND OF THE INVENTION

1. Field of the Invention

The present disclosure relates to a turbine airfoil, a turbine, and a gas turbine including the same.

2. Description of the Background Art

Generally, a gas turbine is a combustion engine in which a mixture of air compressed by a compressor and fuel is combusted to produce high temperature gas that drives a turbine. The gas turbine is used to drive electric generators, aircraft, ships, trains, or the like.

The gas turbine generally includes a compressor, a combustor, and a turbine. The compressor serves to take in external air, compress the air, and transfer the compressed air to the combustor. The compressed air compressed by the compressor has a high temperature and a high pressure. The combustor serves to mix compressed air from the compressor and fuel and combust the mixture of compressed air and fuel to produce combustion gases which are discharged to the gas turbine. The combustion gases drive turbine blades in the turbine to produce power. The power generated through the above processes is applied to a variety of applications such as generation of electricity, driving of mechanical units, etc.

Recently, in order to increase the efficiency of a turbine, the temperature of the gas flowing into the turbine (Turbine Inlet Temperature: TIT) is continuously increasing, and thus, the importance of heat-resistant treatment and cooling of turbine blades has been highlighted.

As a method of cooling turbine airfoils, there are film cooling and internal cooling methods. The film cooling method is a method in which a coating film is formed on an outer surface of the airfoil to prevent heat transfer from the outside to the airfoil. According to the film cooling method, the heat-resistant paint applied to the blade determines the heat-resistant properties and mechanical durability of the blade.

The internal cooling method is a method of cooling the airfoils through heat exchange between a cooling fluid and the airfoils. In general, airfoils are cooled using a compressed cooling air extracted from a compressor of a gas turbine.

A plurality of partition walls forming a flow path for the movement of cooling air are installed inside the airfoil. In addition, a passage connecting the flow path may be formed in the airfoil, and a flow guide for guiding the movement of the cooling air may be installed in the passage.

Since one end of the flow guide is fixed to the suction surface and the other end is fixed to the pressure surface, the flow guide may be structurally weak due to a temperature difference between the pressure surface and the suction surface.

The foregoing is intended merely to aid in the understanding of the background of the present disclosure, and is not intended to mean that the present disclosure falls within the purview of the related art that is already known to those skilled in the art.

DOCUMENT OF RELATED ART (Patent Document 1) Korean Patent Application Publication No. 10-2015-0082944

SUMMARY OF THE INVENTION

Accordingly, the present disclosure has been made keeping in mind the above problems occurring in the related art, and an objective of the present disclosure is to provide an airfoil having improved structural strength, a turbine, and a gas turbine including the same.

In an aspect of the present disclosure, an airfoil includes: a plurality of cooling paths through which cooling air flows; and a first flow guide and a second flow guide disposed at a path connection part connecting adjacent cooling paths of the plurality of cooling paths to guide the flow of the cooling air, wherein the first flow guide is fixed to a pressure surface and the second flow guide is fixed to a suction surface.

In an exemplary embodiment, the first flow guide may include a first fixed end coupled to the pressure surface, and a first free end spaced apart from the suction surface.

In an exemplary embodiment, the second flow guide may include a second fixed end fixed to the suction surface and a second free end spaced apart from the pressure surface.

In an exemplary embodiment, a thickness of the first flow guide may gradually decrease from the first fixed end toward the first free end.

In an exemplary embodiment, the first flow guide and the second flow guide may partially overlap each other when viewed from a height direction of the airfoil.

In an exemplary embodiment, in the overlapped portion of the first flow guide and the second flow guide, the second flow guide may be disposed radially outward of the first flow guide with respect to a center of the airfoil.

In an exemplary embodiment, the first flow guide and the second flow guide may be spaced apart from each other in a longitudinal direction of the first flow guide.

In an exemplary embodiment, the first flow guide and the second flow guide may be curved in an arc shape.

In an exemplary embodiment, a distance between the first flow guide and the second flow guide may gradually decrease in the flow direction of the cooling air.

In an exemplary embodiment, a thickness of the first flow guide may gradually increase toward the second flow guide.

In another aspect of the present disclosure, a turbine includes: a rotatable rotor disk; a plurality of turbine blades installed on the rotor disk; and a plurality of turbine vanes disposed between the turbine blades, wherein each of the plurality of turbine vanes includes: an airfoil having a suction surface and a pressure surface; an inner shroud disposed at one end of the airfoil to support the airfoil; and an outer shroud disposed opposite to the inner shroud at the other end of the airfoil to support the airfoil, wherein the airfoil includes: a plurality of cooling paths through which cooling air flows; and a first flow guide and a second flow guide disposed at a path connection part connecting adjacent cooling paths of the plurality of cooling paths to guide the flow of the cooling air, wherein the first flow guide is fixed to the pressure surface and the second flow guide is fixed to the suction surface.

In an exemplary embodiment, the first flow guide may include a first fixed end coupled to the pressure surface, and a first free end spaced apart from the suction surface.

In an exemplary embodiment, the second flow guide may include a second fixed end fixed to the suction surface and a second free end spaced apart from the pressure surface.

In an exemplary embodiment, a thickness of the first flow guide may gradually decrease from the first fixed end toward the first free end.

In an exemplary embodiment, the first flow guide and the second flow guide may partially overlap each other when viewed from a height direction of the airfoil.

In an exemplary embodiment, in the overlapped portion of the first flow guide and the second flow guide, the second flow guide may be disposed radially outward of the first flow guide with respect to a center of the airfoil.

In an exemplary embodiment, the first flow guide and the second flow guide may be spaced apart from each other in a longitudinal direction of the first flow guide.

In an exemplary embodiment, the first flow guide and the second flow guide may be curved in an arc shape.

In an exemplary embodiment, a distance between the first flow guide and the second flow guide may gradually decrease in the flow direction of the cooling air.

In a further aspect of the present disclosure, a gas turbine includes a compressor compressing air introduced from an outside; a combustor mixing the compressed air by the compressor with fuel and combusting an air-fuel mixture; and a turbine having a plurality of turbine blades rotated by combustion gases combusted by the combustor, wherein the turbine includes: a rotatable rotor disk; a plurality of turbine blades installed on the rotor disk; and a plurality of turbine vanes disposed between the turbine blades, wherein each of the plurality of turbine vanes includes: an airfoil having a suction surface and a pressure surface; an inner shroud disposed at one end of the airfoil to support the airfoil; and an outer shroud disposed opposite to the inner shroud at the other end of the airfoil to support the airfoil, wherein the airfoil includes: a plurality of cooling paths through which cooling air flows; and a first flow guide and a second flow guide disposed at a path connection part connecting adjacent cooling paths of the plurality of cooling paths to guide the flow of the cooling air, wherein the first flow guide is fixed to the pressure surface and the second flow guide is fixed to the suction surface.

According to an aspect of the present disclosure, since the first flow guide is fixed to the pressure surface and the second flow guide is fixed to the suction surface, the flow guide can be prevented from being damaged due to the temperature difference between the suction surface and the pressure surface.

DETAILED DESCRIPTION OF THE INVENTION

Figure 1:
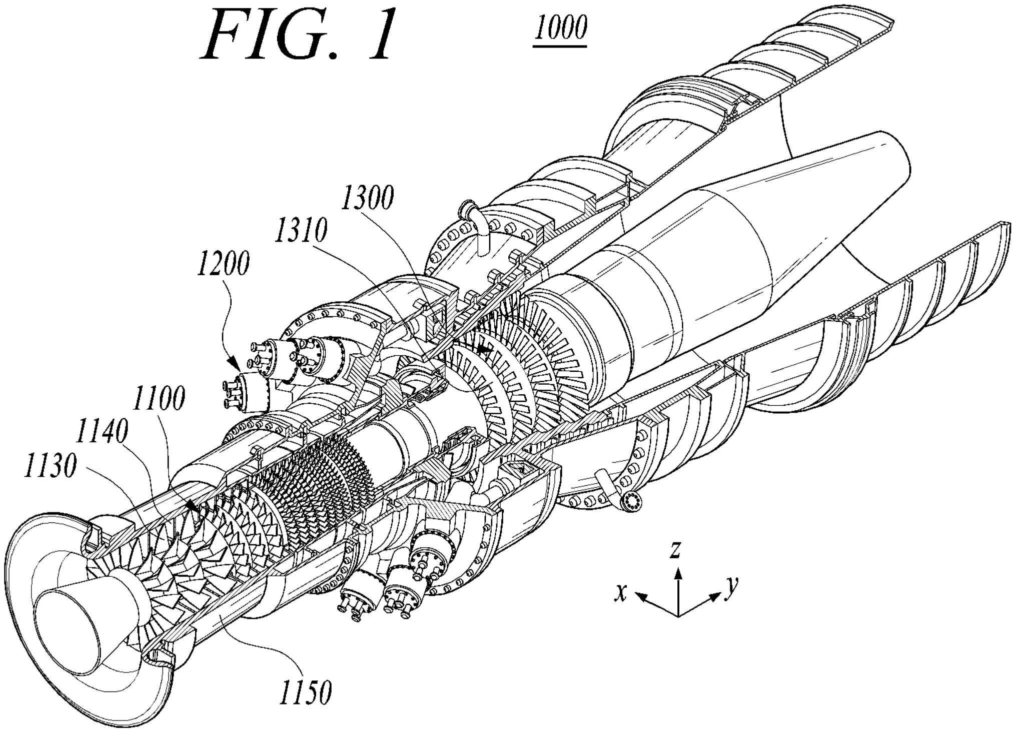
FIG. 1 is a partial cutaway perspective view illustrating the interior of a gas turbine according to a first embodiment of the present disclosure.

Hereinafter, exemplary embodiments of the present disclosure will be described in detail with reference to the accompanying drawings. However, it should be noted that the present disclosure is not limited thereto, and may include all modifications, equivalents, or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols whenever possible. Further, the detailed description of known functions and configurations that may obscure the gist of the present disclosure will be omitted. For the same reason, some of the elements in the drawings are exaggerated, omitted, or schematically illustrated.

Hereinafter, a gas turbine according to a first embodiment of the present disclosure will be described.

Figure 2:
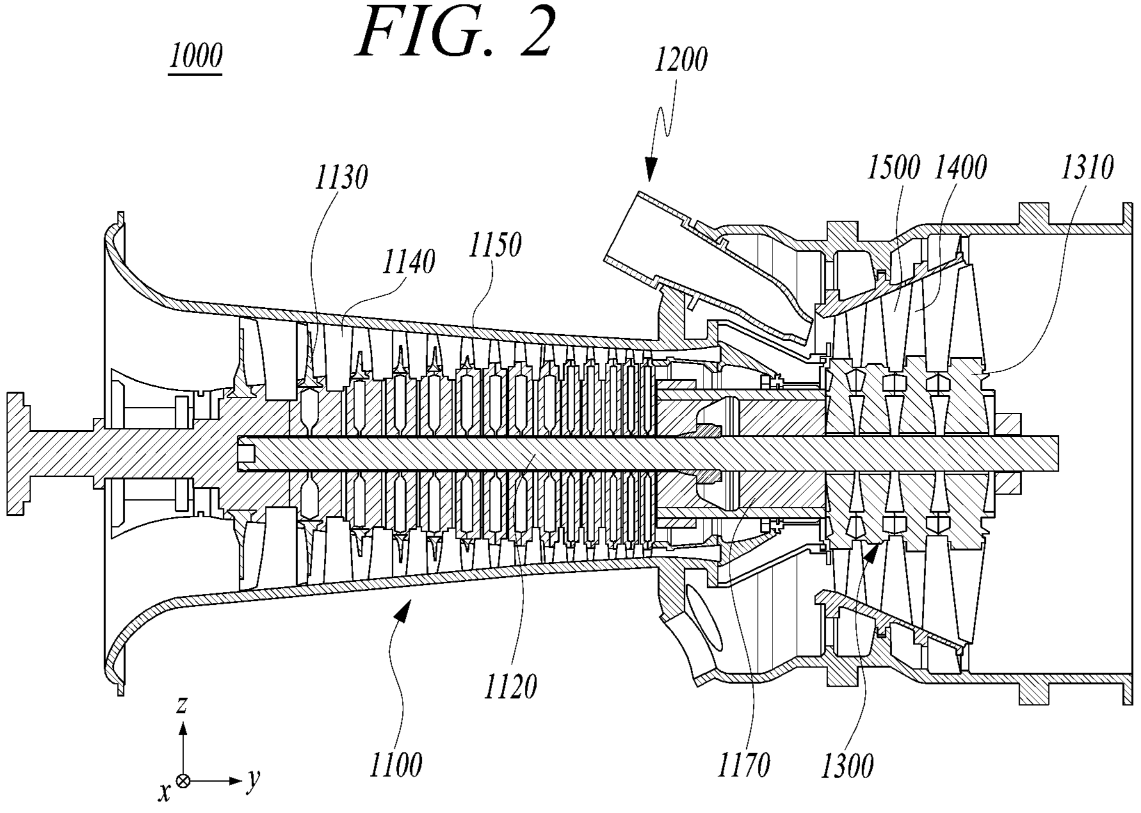
FIG. 2 is a longitudinal section view illustrating a part of the gas turbine of FIG. 1.

FIG. 1 is a partial cutaway perspective view illustrating the interior of a gas turbine according to an embodiment of the present disclosure, and FIG. 2 is a longitudinal section view of the gas turbine of FIG. 1.

Referring to FIGS. 1 and 2, an ideal thermodynamic cycle of a gas turbine 1000 according to the present embodiment follows a Brayton cycle. The Brayton cycle consists of four thermodynamic processes: an isentropic compression (adiabatic compression), an isobaric combustion, an isentropic expansion (adiabatic expansion) and isobaric heat ejection. That is, in the Brayton cycle, atmospheric air is sucked and compressed into high pressure air, mixed gas of fuel and compressed air is combusted at constant pressure to discharge heat energy, heat energy of hot expanded combustion gas is converted into kinetic energy, and exhaust gases containing remaining heat energy is discharged to the outside. That is, gases undergo four thermodynamic processes: compression, heating, expansion, and heat ejection.

As illustrated in FIG. 1, the gas turbine 1000 employing the Brayton cycle includes a compressor 1100, a combustor 1200, and a turbine 1300. Although the following description will be described with reference to FIG. 1, the present disclosure may be widely applied to other turbine engines similar to the gas turbine 1000 illustrated in FIG. 1.

Referring to FIG. 1, the compressor 1100 of the gas turbine 1000 may suck and compress air. The compressor 1100 may serve both to supply the compressed air by compressor blades 1130 to a combustor 1200 and to supply the cooling air to a high temperature region of the gas turbine 1000. Here, since the sucked air undergoes an adiabatic compression process in the compressor 1100, the air passing through the compressor 1100 has increased pressure and temperature.

The compressor 1100 is usually designed as a centrifugal compressor or an axial compressor, wherein the centrifugal compressor is applied to a small-scale gas turbine, whereas a multi-stage axial compressor 1100 is applied to a large-scale gas turbine 1000 illustrated in FIG. 1 since the large-scale gas turbine 1000 is required to compress a large amount of air. In this case, in the multi-stage axial compressor 1100, the compressor blades 1130 rotate according to the rotation of a central tie rod 1120 and rotor disks to compress the introduced air and move the compressed air to compressor vanes 1140 on the rear stage. As the air passes through the blades 1130 formed in multiple stages, the air is compressed to a higher pressure.

The compressor vanes 1140 are mounted inside a housing 1150 in stages. The compressor vanes 1140 guide the compressed air moved from front side compressor blades 1130 toward rear-side compressor blades 1130. In one embodiment, at least some of the compressor vanes 1140 may be mounted so as to be rotatable within a predetermined range for adjustment of an air inflow, or the like.

The compressor 1100 may be driven using a portion of the power output from the turbine 1300. To this end, as illustrated in FIG. 1, a rotary shaft of the compressor 1100 and a rotary shaft of the turbine 1300 may be directly connected by a torque tube 1170. In case of the large-scale gas turbine 1000, almost half of the output produced by the turbine 1300 may be consumed to drive the compressor 1100.

The combustor 1200 may mix compressed air supplied from the outlet of the compressor 1100 with fuel and combust the air-fuel mixture at a constant pressure to produce high-energy combustion gas. That is, the combustor 1200 mixes the inflowing compressed air with fuel and combusts the mixture to produce high-temperature and high-pressure combustion gas with high energy, of which temperature is raised, through an isobaric combustion process, to a temperature that the combustor and turbine parts can withstand without being thermally damaged.

The combustor 1200 may include: a plurality of burners arranged in a housing formed in a cell shape and having a fuel injection nozzle, or the like; a combustor liner forming a combustion chamber; and a transition piece connecting the combustor to the turbine.

In the meantime, the high-temperature and high-pressure combustion gas from the combustor 1200 is supplied to the turbine 1300. As the supplied high-temperature and high-pressure combustion gas expands, impulse and impact forces are applied to turbine blades 1400 of the turbine 1300 to generate rotational torque, which is transferred to the compressor 1100 through the torque tube 1170, wherein an excess of power exceeding the power required to drive the compressor 1100 is used to drive a generator, or the like.

The turbine 1300 includes a rotor disk 1310, and a plurality of turbine blades 1400 and turbine vanes 1500 arranged radially on the rotor disk 1310

The rotor disk 1310 has a substantially disk shape, and a plurality of grooves are formed in the outer circumferential portion thereof. The grooves are formed to have a curved surface, and turbine blades 1400 and vanes 1500 are inserted into the grooves. The turbine blades 1400 may be coupled to the rotor disk 1310 in a manner such as a dovetail connection. The vanes 1500 are fixed so as not to rotate and serve to guide the flow direction of the combustion gas passed through the turbine blades 1400.

Figure 3:
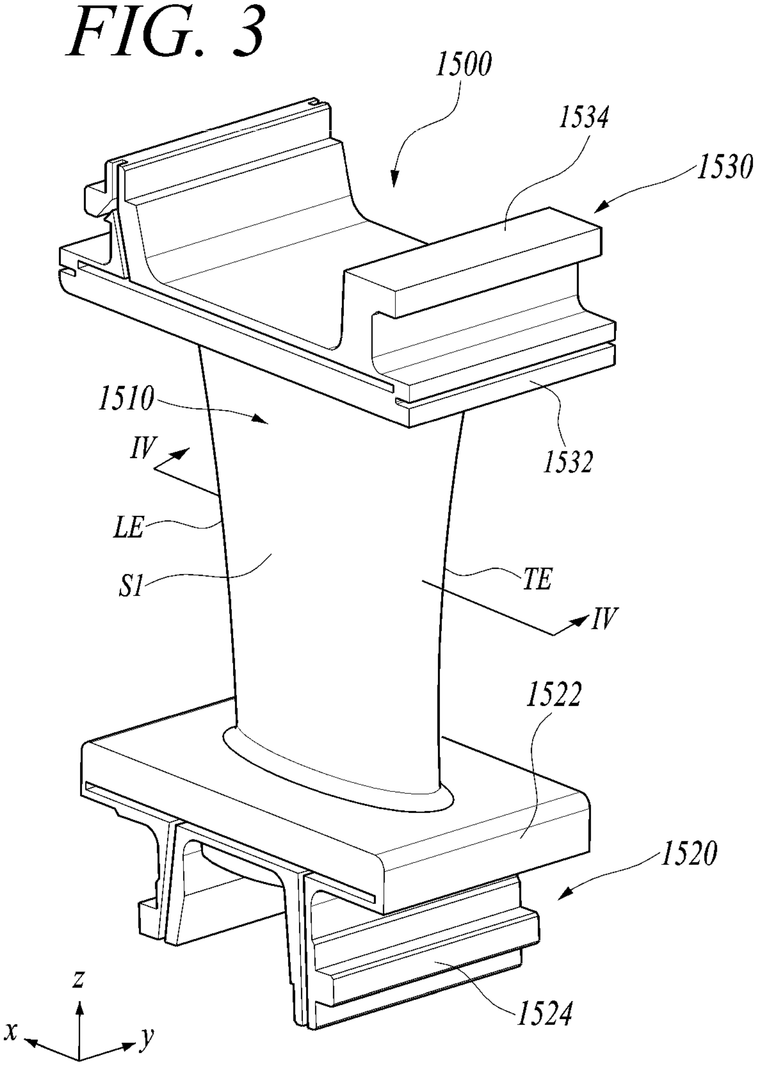
FIG. 3 is a perspective view illustrating a turbine vane according to the first embodiment of the present disclosure.
Figure 4:
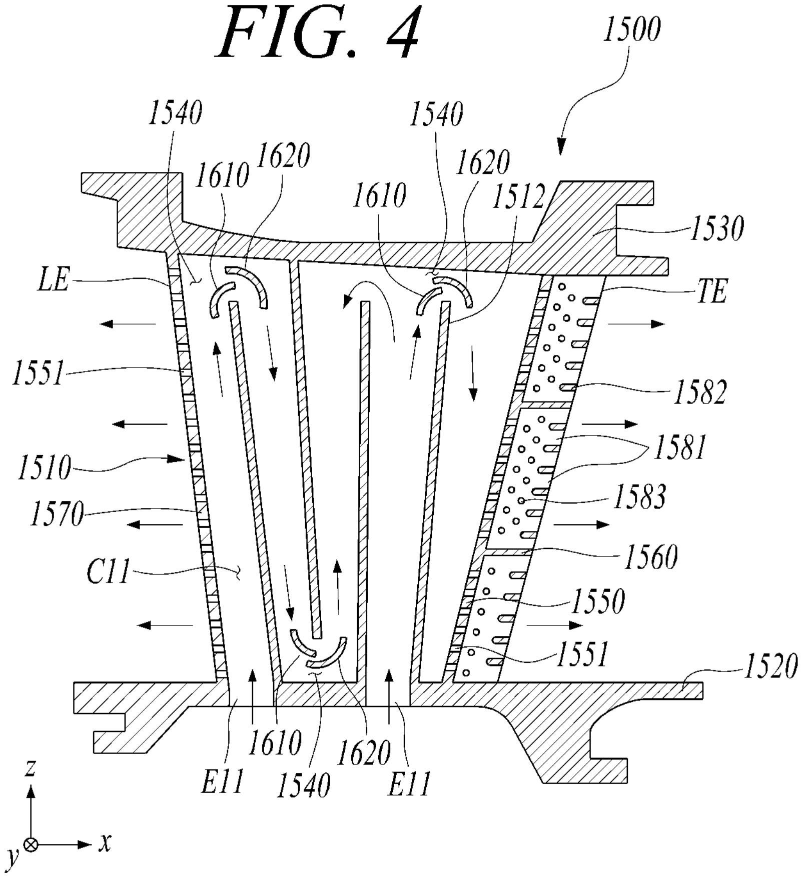
FIG. 4 is a longitudinal section view taken along the plane designated by line IV-IV in FIG. 3.
Figure 5:
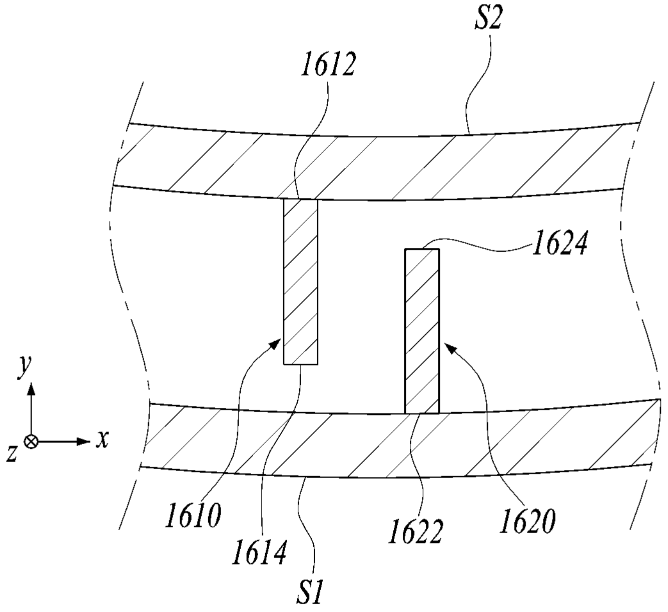
FIG. 5 is a partial cross-sectional view of an airfoil of the turbine vane cut along the thickness direction of the airfoil according to the first embodiment of the present disclosure.

FIG. 3 is a perspective view illustrating a turbine vane according to the first embodiment of the present disclosure. FIG. 4 is a longitudinal section view taken along the plane designated by line IV-IV in FIG. 3. FIG. 5 is a partial cross-sectional view of an airfoil of the turbine vane cut along the thickness direction of the airfoil according to the first embodiment of the present disclosure. Here, the thickness direction refers to y-axis direction annotated in FIGS. 3 to 5.

Referring to FIGS. 3 to 5, the turbine vane 1500 includes an inner shroud part 1520, an outer shroud part 1530, and an airfoil part 1510 located between the inner shroud part 1520 and the outer shroud part 1530.

The airfoil part 1510 may be formed from an airfoil-shaped curved plate, and may be formed to have an airfoil optimized according to the specifications of the gas turbine 1000. The airfoil part 1510 may include a leading edge LE disposed on an upstream side and a trailing edge TE disposed on a downstream side on the basis of a flow direction of the combustion gas.

In addition, the airfoil part 1510 has a suction surface S1 forming a convex surface curved outwardly and a pressure surface S2 forming a curved surface concavely recessed toward the suction surface S1.

The inner shroud part 1520 is coupled to an internal structure of the turbine 1300 and is disposed at an inner end of the airfoil part 1510 to support the airfoil part 1510. The inner shroud part 1520 includes an inner platform 1522 coupled to an inner side of the airfoil part 1510 and an inner hook 1524 protruding downward from the inner platform 1522. An inlet E11 connected to a cooling path C11 is formed in the inner platform 1522, and cooling air may be introduced into the airfoil part 1510 through the inlet E11. In this embodiment, the inner platform 1522 is illustrated as having two inlets E11 formed, but the present disclosure is not limited thereto.

The outer shroud part 1530 is coupled to a vane carrier (not shown) installed on a radially outer side of the turbine vane 1500 with respect to a central axis of the turbine and is disposed at an outer end of the airfoil part 1510 to support the airfoil part 1510. The outer shroud part 1530 includes an outer platform 1532 coupled to the outer end of the airfoil part 1510 and an outer hook 1534 protruding above the outer platform 1532 and coupled to the vane carrier.

The airfoil part 1510 may include an outer wall 1570 forming an outer shape, cooling paths C11 formed in the outer wall 1570, partition plates 1512, and a perforated plate 1550. The cooling paths C11 are connected to the inlet E11 to receive cooling air therethrough.

A plurality of cooling holes 1511 are formed on the surface of the airfoil part 1510, and the cooling holes 1511 communicate with the cooling paths C11 formed in the airfoil part 1510 to supply cooling air to the surface of the airfoil part 1510.

The perforated plate 1550 may be installed between the trailing edge TE and the cooling path C11 disposed on the rear side of the airfoil part 1510. The perforated plate 1550 extends in a height direction (refer to z-direction in FIG. 4) of the cooling path C11 disposed on the rear side thereof. A plurality of holes 1551 are formed in the perforated plate 1550. The space between the perforated plate 1550 and the trailing edge TE is divided by partition walls 1560 that are spaced apart from each other in the height direction of the airfoil part 1510. One side of the partition wall 1560 may be connected to the perforated plate 1550, and the other side of the partition wall 1560 may be connected to the trailing edge TE.

The airfoil part 1510 may further include a plurality of rear end cooling slots 1581 connected to the cooling path C11 to discharge the air from the cooling path C11 and formed to be spaced apart in the height direction of the trailing edge TE, and a plurality of partition protrusions 1582 formed between the rear end cooling slots 1581 to divide the rear end cooling slots 1581. The air introduced into the cooling path C11 through the inlet E11 is discharged through the rear end cooling slots 1581. In addition, a plurality of cooling protrusions 1583 may be formed between the perforated plate 1550 and the trailing edge TE.

Each of the partition plates 1512 is alternately fixed to one end side in the longitudinal direction of the airfoil part 1510 in the airfoil part 1510 so as to be spaced apart from each other to connect the cooling paths C11, forming a path connection part 1540 at which a flow direction of cooling air is changed. The flow direction of the cooling air is changed at the path connection part 1540 so that the cooling air flows along another cooling path. That is, the cooling air flowing from one end side to the other end side may change the flow direction at the path connection part 1540, so that the cooling air may flow from the other end side to the one end side, and vice versa.

A first flow guide 1610 and a second flow guide 1620 may be installed in the path connecting part 1540 at which the flow direction of the cooling air is changed in the airfoil part 1510. The first flow guide 1610 and the second flow guide 1620 are curved in an arc shape to guide the flow of the cooling air and to minimize an occurrence of vortices. The path connection parts 1540 may be formed in plural inside of the airfoil part 1510, and the first flow guide 1610 and the second flow guide 1620 may be installed in each path connection part 1540.

As shown in FIG. 5, the first flow guide 1610 may be fixed only to the pressure surface S2, and the second flow guide 1620 may be fixed only to the suction surface S1. The first flow guide 1610 may include a first fixed end 1612 coupled to the pressure surface S2 and a first free end 1614 spaced apart from the suction surface S1. Also, the second flow guide 1620 may include a second fixed end 1622 coupled to the suction surface S1 and a second free end 1624 spaced apart from the pressure surface S2.

Accordingly, the first flow guide 1610 receives heat from the pressure surface S2, and the second flow guide 1620 receives heat from the suction surface S1, so it is possible to prevent the strength of the first flow guide 1610 and the second flow guide 1620 from being lowered due to a temperature difference between the suction surface S1 and the pressure surface S2.

In addition, as shown in FIG. 4, the first flow guide 1610 and the second flow guide 1620 may partially overlap when viewed from a height direction (refer to z-axis direction) of the airfoil part 1510, and in the overlapped portion, the second flow guide 1620 may be disposed radially outward of the first flow guide 1610 with respect to a center of the airfoil part 1510.

The first flow guide 1610 and the second flow guide 1620 may be located on the upstream side and downstream side, respectively, with respect to the flow direction of the cooling air, and a longitudinally rear portion of the first flow guide 1610 and a longitudinally front portion of the second flow guide 1620 may overlap.

The first flow guide 1610 is connected from the cooling path to the path connection part 1540 to guide an inflow of the cooling air into the path connection part 1540, and the second flow guide 1620 is connected from the path connection part 1540 to the cooling path C11 to guide a flow of the cooling air from the path connection part 1540 to the cooling path C11.

As such, when the first flow guide 1610 and the second flow guide 1620 are formed to overlap each other, the cooling air may naturally flow from one cooling path C11 to another cooling path C11 without pressure loss.

The first flow guide 1610 and the second flow guide 1620 may be disposed adjacent to the outer shroud part 1530 as well as the inner shroud part 1520.

Figure 6:
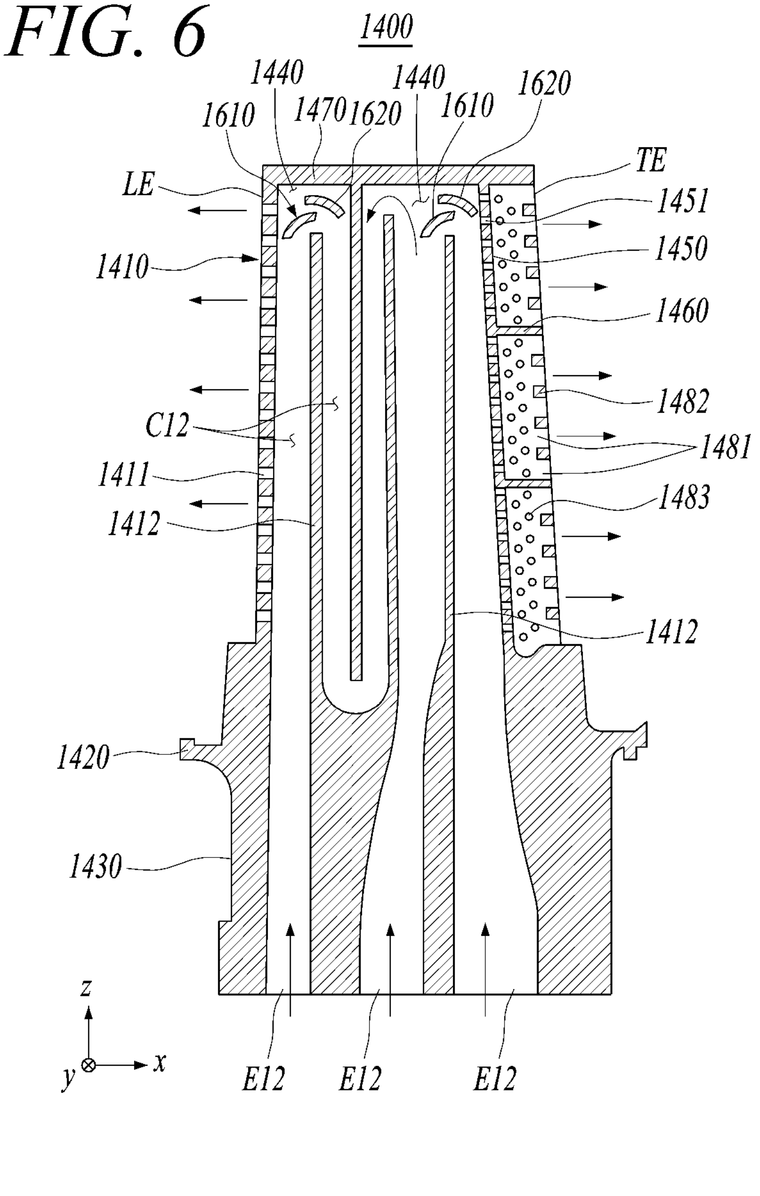
FIG. 6 is a longitudinal section view of a turbine blade according to the first embodiment of the present disclosure.

FIG. 6 is a longitudinal-sectional view of a turbine blade according to the first embodiment of the present disclosure.

Referring to FIG. 6, the turbine blade 1400 includes an airfoil-shaped airfoil part 1410, a platform part 1420 coupled to a lower portion of the airfoil 1410, and a root part 1430 that protrudes downward from the platform part 1420 so as to be coupled to the rotor disk 1310. The airfoil part 1410 may be formed from an airfoil-shaped curved plate, and may be formed to have an airfoil shape optimized according to the specifications of the gas turbine 1000.

The platform part 1420 may have a substantially rectangular plate or rectangular pillar shape disposed between the airfoil part 1410 and the root part 1430. The platform part 1420 is in contact with a platform part of an adjoining turbine blade 1400 at their lateral sides, thereby serving to maintain a gap between the adjacent turbine blades 1400.

The root part 1430 has an approximately fir-shaped curved portion, which is formed to correspond to the shape of a curved portion formed in a slot of the rotor disk 1310. Here, a coupling structure of the root part 1430 does not necessarily have a fir tree shape, but may be formed to have a dovetail shape. A plurality of second inlets E12 for supplying cooling air may be formed at a lower end of the root part 1430.

The airfoil part 1410 may include a leading edge LE disposed on an upstream side and a trailing edge TE disposed on a downstream side on the basis of a flow direction of combustion gas. In addition, the airfoil part 1410 has a suction surface forming a convex surface curved outwardly and a pressure surface forming a curved surface concavely recessed toward the suction surface. A pressure difference between the suction surface and the pressure surface of the airfoil part 1410 allows the blade 1400 to rotate.

A plurality of cooling holes 1411 is formed in the surface of the airfoil part 1410 such that the cooling holes 1411 communicate with a cooling path C12 formed in the airfoil part 1410 to provide cooling air to the surface of the airfoil part 1410.

The airfoil part 1410 may include an outer wall 1470 forming an outer contour, cooling paths C12 formed in the outer wall 1470, a partition plate 1412, a partition wall 1460, and a perforated plate 1450, wherein a plurality of holes 1451 are formed in the perforated plate 1450.

The airfoil part 1410 may further include a plurality of rear end cooling slots 1481, which is spaced apart in the height direction (refer to z-axis direction) of the trailing edge TE so as to be connected to the cooling path C12 to discharge air from the cooling path C12, and a plurality of dividing protrusions 1482 formed between the rear end cooling slots 1481 to separate the rear end cooling slots 1481. The air introduced into the cooling path C12 through the inlet E12 is discharged through the rear end cooling slots

1481. In addition, a plurality of cooling protrusions 1483 may be formed between the perforated plate 1450 and the trailing edge TE.

Each of the partition plates 1412 are alternately fixed to one end side in the longitudinal direction of the airfoil part 1510 in the airfoil part 1410 so as to be spaced apart from each other to connect the cooling paths C12, forming a path connection part 1440 at which a flow direction of cooling air is changed so that the cooling air flows along another cooling path C12. That is, the cooling air flowing from one end side to the other end side may change the flow direction at the path connection part 1440, so that the cooling air may flow from the other end side to the one end side, and vice versa.

A first flow guide 1610 and a second flow guide 1620 may be installed in the path connection part 1440 at which the flow direction of the cooling air is changed in the airfoil part 1410. The first flow guide 1610 and the second flow guide 1620 are curved in an arc shape to guide a flow of the cooling air and to minimize the occurrence of vortices. The first flow guide 1610 may be fixed only to the pressure surface, and the second flow guide 1620 may be fixed only to the suction surface. Since the first flow guide 1610 and the second flow guide 1620 have the same structure as the first flow guide 1610 and the second flow guide 1620 installed in the turbine vane 1500, a repeated description will be omitted.

Hereinafter, a turbine vane according to a second embodiment of the present disclosure will be described.

Figure 7:
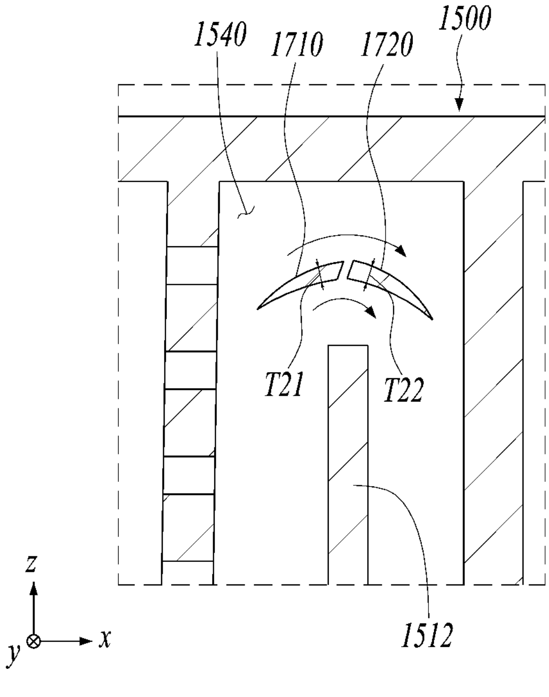
FIG. 7 is a partial longitudinal section view of an airfoil showing a path connection part according to a second embodiment of the present disclosure.

FIG. 7 is a longitudinal-sectional view of the turbine vane cut along the height direction according to the second embodiment of the present disclosure.

Referring to FIG. 7, the turbine vane 1500 according to this embodiment has the same configuration as the turbine vane according to the first embodiment, except for a first flow guide 1710 and a second flow guide 1720, so a repeated description for the same configuration will be omitted.

The first flow guide 1710 and the second flow guide 1720 may be installed in a path connection part 1540 at which the flow direction of the cooling air is changed in the airfoil part 1510. The first flow guide 1710 and the second flow guide 1720 are curved in an arc shape to guide a flow of the cooling air and to minimize the occurrence of vortices.

The first flow guide 1710 may be fixed only to the pressure surface, and the second flow guide 1720 may be fixed only to the suction surface. In addition, the first flow guide 1710 and the second flow guide 1720 may be spaced apart from each other in the longitudinal direction of the first flow guide 1710. In addition, the thickness T21 of the first flow guide 1710 gradually increases toward the second flow guide 1720, and the thickness T22 of the second flow guide 1720 may gradually increase toward the first flow guide 1710.

According to the present embodiment, the first flow guide 1710 and the second flow guide 1720 may be fixed to different surfaces so as to prevent damage generated due to thermal stress, as well as to stably guide a flow of the cooling air.

Hereinafter, a turbine vane according to a third embodiment of the present disclosure will be described.

Figure 8:
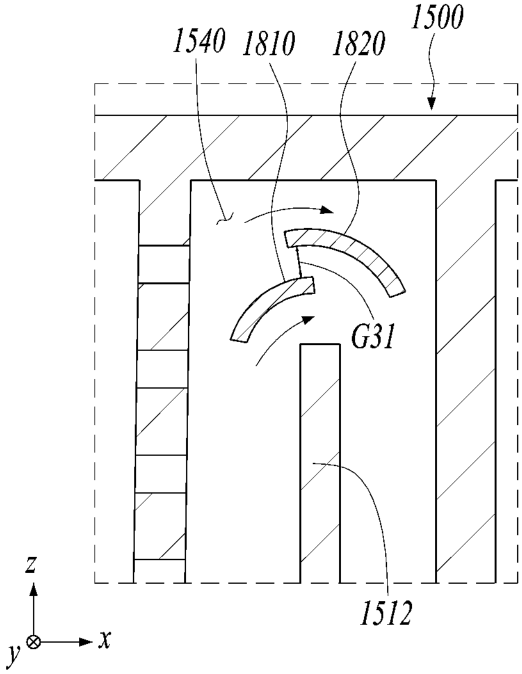
FIG. 8 is a partial longitudinal section view of an airfoil showing a path connection part according to a third embodiment of the present disclosure.
Figure 9:
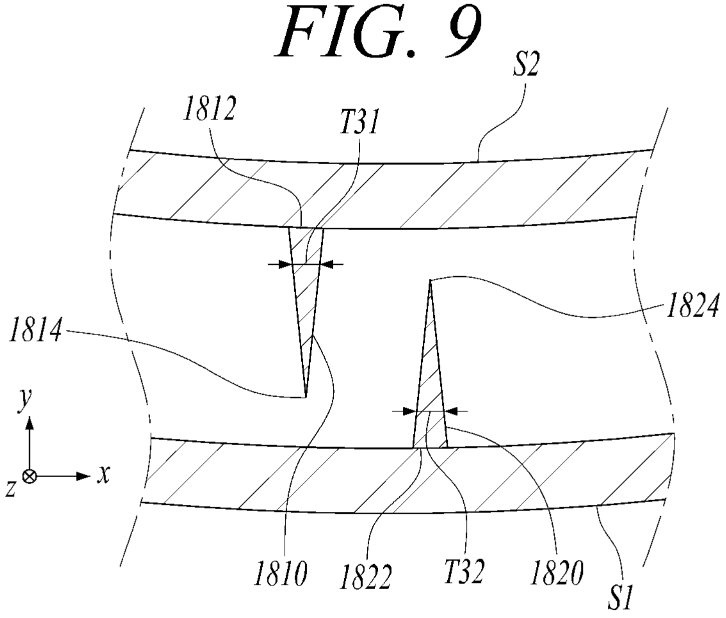
FIG. 9 is a partial cross-sectional view of the airfoil cut along the thickness direction of the airfoil according to the third embodiment of the present disclosure.

FIG. 8 is a longitudinal-sectional view of the turbine vane cut along the height direction according to the third embodiment of the present disclosure, and FIG. 9 is a partial cross-sectional view of an airfoil cut along the thickness direction according to the third embodiment of the present disclosure.

Referring to FIGS. 8 and 9, the turbine vane 1500 according to this embodiment has the same configuration as the turbine vane according to the first embodiment, except for a first flow guide 1810 and a second flow guide 1820, so a repeated description for the same configuration will be omitted.

The first flow guide 1810 and the second flow guide 1820 may be installed in a path connection part 1540 at which the flow direction of the cooling air is changed in the airfoil part 1510. The first flow guide 1810 and the second flow guide 1820 are curved in an arc shape to guide a flow of the cooling air and to minimize the occurrence of vortices.

The first flow guide 1810 may be fixed only to the pressure surface S2, and the second flow guide 1820 may be fixed only to the suction surface S1. The first flow guide 1810 may include a first fixed end 1812 coupled to the pressure surface S2 and a first free end 1814 spaced apart from the suction surface. In addition, the second flow guide 1820 may include a second fixed end 1822 coupled to the suction surface S1 and a second free end 1824 spaced apart from the pressure surface S2.

In addition, the first flow guide 1810 and the second flow guide 1820 may partially overlap with each other when viewed from the height direction (refer to z-axis direction) of the airfoil part 1510, and in the overlapped portion, the second flow guide 1820 may be disposed radially outward of the first flow guide 1810 with respect to the center of the airfoil part 1510.

The first flow guide 1810 and the second flow guide 1820 may be located on the upstream side and the downstream side, respectively, with respect to the flow direction of the cooling air. In addition, a gap G31 between the first flow guide 1810 and the second flow guide 1820 may gradually decrease in the flow direction of the cooling air. Accordingly, the cooling air may be easily introduced into the space between the first flow guide 1810 and the second flow guide 1820 and be guided by the second flow guide 1820.

In addition, the first flow guide 1810 may be formed such that the thickness T31 gradually decreases from the first fixed end 1812 to the first free end 1814, and the second flow guide 1820 may be formed such that the thickness T32 gradually decreases from the second fixed end 1822 to the second free end 1824. Accordingly, structural strength may be maintained even if the first flow guide 1810 and the second flow guide 1820 have free ends.

While the embodiments of the present disclosure have been described, it will be apparent to those skilled in the art that various modifications and variations can be made in the present disclosure through addition, change, omission, or substitution of components without departing from the spirit of the invention as set forth in the appended claims, and such modifications and changes may also be included within the scope of the present disclosure.

What is claimed is:

1. An airfoil comprising:

a plurality of cooling paths through which cooling air flows; and a first flow guide and a second flow guide disposed at a path connection part connecting adjacent cooling paths of the plurality of cooling paths to guide the flow of the cooling air, wherein the first flow guide is fixed to a pressure surface and the second flow guide is fixed to a suction surface, wherein the first flow guide is connected from a downstream of a cooling path of the plurality of cooling paths to the path connection part, and the second flow guide is connected from the path connection part to an upstream of an adjacent cooling path of the plurality of cooling paths, wherein the first flow guide and the second flow guide partially overlap with each other when viewed from a height direction of the airfoil; and a leading end of the second flow guide is positioned radially outward compared to a trailing end of the first flow guide, the trailing end of the first flow guide is positioned radially outward compared to a trailing end of the second flow guide, and the trailing end of the second flow guide is positioned radially outward compared to a leading end of the first flow guide, all the radial positions being with respect to a center of a partition plate dividing the cooling path and the adjacent cooling path.

2. The airfoil according to claim 1, wherein the first flow guide includes a first fixed end coupled to the pressure surface, and a first free end spaced apart from the suction surface.

3. The airfoil according to claim 2, wherein the second flow guide includes a second fixed end fixed to the suction surface and a second free end spaced apart from the pressure surface.

4. The airfoil according to claim 2, wherein a thickness of the first flow guide gradually decreases from the first fixed end toward the first free end.

5. The airfoil according to claim 1, wherein the first flow guide and the second flow guide are curved in an arc shape.

6. The airfoil according to claim 1, wherein a distance between the first flow guide and the second flow guide gradually decreases in the flow direction of the cooling air.

7. The airfoil according to claim 1, wherein a thickness of the first flow guide gradually increases toward the second flow guide.

8. A turbine comprises:

a rotatable rotor disk;

a plurality of turbine blades installed on the rotor disk; and a plurality of turbine vanes disposed between the turbine blades, each of the plurality of turbine vanes comprising:

an airfoil having a suction surface and a pressure surface;

an inner shroud disposed at one end of the airfoil to support the airfoil; and an outer shroud disposed opposite to the inner shroud at the other end of the airfoil to support the airfoil, the airfoil comprising:

a plurality of cooling paths through which cooling air flows; and a first flow guide and a second flow guide disposed at a path connection part connecting adjacent cooling paths of the plurality of cooling paths to guide the flow of the cooling air, wherein the first flow guide is fixed to the pressure surface and the second flow guide is fixed to the suction surface, wherein the first flow guide is connected from a downstream of a cooling path of the plurality of cooling paths to the path connection part, and the second flow guide is connected from the path connection part to an upstream of an adjacent cooling path of the plurality of cooling paths, wherein the first flow guide and the second flow guide partially overlap with each other when viewed from a height direction of the airfoil; and a leading end of the second flow guide is positioned radially outward compared to a trailing end of the first flow guide, the trailing end of the first flow guide is positioned radially outward compared to a trailing end of the second flow guide, and the trailing end of the second flow guide is positioned radially outward compared to a leading end of the first flow guide, all the radial positions being with respect to a center of a partition plate dividing the cooling path and the adjacent cooling path.

9. The turbine according to claim 8, wherein the first flow guide includes a first fixed end coupled to the pressure surface, and a first free end spaced apart from the suction surface.

10. The turbine according to claim 9, wherein the second flow guide includes a second fixed end fixed to the suction surface and a second free end spaced apart from the pressure surface.

11. The turbine according to claim 9, wherein a thickness of the first flow guide gradually decreases from the first fixed end toward the first free end.

12. The turbine according to claim 8, wherein the first flow guide and the second flow guide are curved in an arc shape.

13. The turbine according to claim 8, wherein a distance between the first flow guide and the second flow guide gradually decreases in the flow direction of the cooling air.

14. A gas turbine comprising:

a compressor compressing air introduced from an outside;

a combustor mixing the compressed air by the compressor with fuel and combusting an air-fuel mixture; and a turbine having a plurality of turbine blades rotated by combustion gases combusted by the combustor, the turbine comprising:

a rotatable rotor disk;

a plurality of turbine blades installed on the rotor disk; and a plurality of turbine vanes disposed between the turbine blades, each of the plurality of turbine vanes comprising:

an airfoil having a suction surface and a pressure surface;

an inner shroud disposed at one end of the airfoil to support the airfoil; and an outer shroud disposed opposite to the inner shroud at the other end of the airfoil to support the airfoil, the airfoil comprising:

a plurality of cooling paths through which cooling air flows; and a first flow guide and a second flow guide disposed at a path connection part connecting adjacent cooling paths of the plurality of cooling paths to guide the flow of the cooling air, wherein the first flow guide is fixed to the pressure surface and the second flow guide is fixed to the suction surface, wherein the first flow guide is connected from a downstream of a cooling path of the plurality of cooling paths to the path connection part, and the second flow guide is connected from the path connection part to an upstream of an adjacent cooling path of the plurality of cooling paths, wherein the first flow guide and the second flow guide partially overlap with each other when viewed from a height direction of the airfoil; and a leading end of the second flow guide is positioned radially outward compared to a trailing end of the first flow guide, the trailing end of the first flow guide is positioned radially outward compared to a trailing end of the second flow guide, and the trailing end of the second flow guide is positioned radially outward compared to a leading end of the first flow guide, all the radial positions being with respect to a center of a partition plate dividing the cooling path and the adjacent cooling path.

* * * * *